US012744756B2

(12) United States Patent
Lu et al.

(10) Patent No.: US 12,744,756 B2
(45) Date of Patent: Sep. 22, 2026

(54) METHODS AND DEVICES FOR UE SERVICE MANAGEMENT

(71) Applicant: Telefonaktiebolaget LM Ericsson (publ), Stockholm (SE)

(72) Inventors: Yunjie Lu, Shanghai (CN); Wenliang Xu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 650 days.

(21) Appl. No.: 18/250,204

(22) PCT Filed: Jun. 22, 2021

(86) PCT No.: PCT/EP2021/067005
§ 371 (c)(1),
(2) Date: Apr. 21, 2023

(87) PCT Pub. No.: WO2022/083903
PCT Pub. Date: Apr. 28, 2022

(65) Prior Publication Data

US 2023/0388268 A1 Nov. 30, 2023

(30) Foreign Application Priority Data

Oct. 23, 2020 (WO) ................ PCT/CN2020/123431

(51) Int. Cl.
*H04L 67/51* (2022.01)
*H04L 61/5007* (2022.01)
(Continued)

(52) U.S. Cl.
CPC .......... *H04L 61/5007* (2022.05); *H04L 67/51* (2022.05); *H04W 8/26* (2013.01); *H04L 2101/659* (2022.05)

(58) Field of Classification Search
CPC ........................................................ H04L 67/51
(Continued)

(56) References Cited

U.S. PATENT DOCUMENTS 9,980,158 B2 * 5/2018 Kim .................... H04L 61/5061
2020/0128450 A1 4/2020 Wang
2020/0274805 A1 8/2020 Yang et al.

FOREIGN PATENT DOCUMENTS

EP 3860174 A1 8/2021
JP 2020-523870 A 8/2020
(Continued)

OTHER PUBLICATIONS

Office Action, KR App. No. 10-2023-7016585, May 7, 2025, 10 pages (4 pages of English translation and 6 pages of Original Document).
(Continued)

*Primary Examiner* — Sibte H Bukhari
(74) *Attorney, Agent, or Firm* — Nicholson De Vos Webster & Elliott LLP

(57) ABSTRACT

A method for a user equipment (UE) service management network element in a communication network, comprising: receiving a first request, and in response to determining that the first request is to request the UE service management network element to be an intermediate UE service management network element for a service of a UE, sending a second request to another UE service management network element indicated in the first request, and receiving a response corresponding to the second request, wherein the response comprises Internet Protocol (IP) address information of the UE.

13 Claims, 7 Drawing Sheets

(51) Int. Cl.
*H04W 8/26* (2009.01)
*H04L 101/659* (2022.01)

(58) Field of Classification Search
USPC .......................................................... 370/392
See application file for complete search history.

(56) References Cited

FOREIGN PATENT DOCUMENTS

| | | | | |
|---|---|---|---|---|
| WO | WO-2020063998 A1 * | 4/2020 | ............ | H04W 40/02 |
| WO | 2020/200242 A1 | 10/2020 | | |
| WO | 2022/083903 A1 | 4/2022 | | |

OTHER PUBLICATIONS

International Search Report and Written Opinion for Application No. PCT/EP2021/067005, Sep. 9, 2021, 13 pages.

3GPP TS 23.501 V16.6.0, "3rd Generation Partnership Project; Technical Specification Group Services and System Aspects; System architecture for the 5G System (5GS); Stage 2 (Release 16)," Sep. 2020, 447 pages, 3GPP Organizational Partners.

3GPP TS 23.502 V16.5.1, "3rd Generation Partnership Project; Technical Specification Group Services and System Aspects; Procedures for the 5G System (5GS); Stage 2 (Release 16)," Aug. 2020, 594 pages, 3GPP Organizational Partners.

3GPP TS 23.502 V16.6.0, "3rd Generation Partnership Project; Technical Specification Group Services and System Aspects; Procedures for the 5G System (5GS); Stage 2 (Release 16)," Sep. 2020, 597 pages, 3GPP Organizational Partners.

3GPP TS 29.502 V16.5.0, "3rd Generation Partnership Project; Technical Specification Group Core Network and Terminals; 5G System; Session Management Services; Stage 3 (Release 16)," Sep. 2020, 260 pages, 3GPP Organizational Partners.

Huawei et al., "Solution: IP address allocation," Feb. 26-Mar. 2, 2018, 4 pages, SA WG2 Meeting #126, S2-182222, Montreal, Canada.

Huawei et al., "Clarification on IPv6 Router Advertisement message in ETSUN," Oct. 14-18, 2019, 3 pages, 3GPP TSG-WG SA2 Meeting #135, S2-1908936, Split, Croatia.

Decision to Grant, JP App. No. 2023-524797, Oct. 15, 2024, 5 pages (2 pages of English Translation and 3 pages of Original Document).

Ericsson, "IPV6 Index for I-SMF," Nov. 10-20, 2020, 22 pages, 3GPP TSG-CT WG4 Meeting #101e, C4-205360, E-Meeting.

Office Action, AU App. No. 2021366092, Dec. 20, 2023, 03 pages of Original Document Only.

Office Action, JP App. No. 2023-524797, Apr. 30, 2024, 03 pages of Original Document only.

* cited by examiner

METHODS AND DEVICES FOR UE SERVICE MANAGEMENT

CROSS-REFERENCE TO RELATED APPLICATIONS

This application is a National stage of International Application No. PCT/EP2021/067005, filed Jun. 22, 2021, which claims priority to International Application No. PCT/CN2020/123431, filed Oct. 23, 2020, which are hereby incorporated by reference.

TECHNICAL FIELD

The present disclosure generally relates to the technical field of telecommunications, and more specifically to methods, network elements, devices, computer-readable storage and carrier, etc. for, such as a UE service management network element discovery and selection.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In User Equipment (UE) IP address management in 5G network, there is a scenario where UE has an established PDU Session with a UPF including a PDU Session Anchor 1, which is controlled by SMF and an I-SMF and an I-UPF controlled by the I-SMF have already been inserted for the PDU Session. At some point, using a list of DNAI(s) of interest for this PDU Session received from the SMF, the I-SMF decides to establish a new PDU Session Anchor e.g. due to UE mobility. The I-SMF selects a UPF and using N4 establishes the new PDU Session Anchor 2 (PSA2) of the PDU Session.

SUMMARY

It is one or more object(s) of the present disclosure to address one or more of the problems arisen in IP address management.

According to a first embodiment of the disclosure, there is provided a method for a UE service management network element in a communication network, comprising:

- receiving a first request, and
- in response to determining that the first request is to request the UE service management network element to be an intermediate UE service management network element for a service of a UE:
  - sending a second request to another UE service management network element indicated in the first request, and
  - receiving a response corresponding to the second request, wherein the response comprises Internet Protocol, IP, address information of the UE.

According to a second embodiment of the disclosure, there is provided a UE service management network element operative in a communication network, comprising:

- a first receiving component, configured to receive a first request,
- a first sending component, configured to send a second request to another UE service management network element indicated in the first request in response to that the first request is to request the UE service management network element to be an intermediate UE service management network element for a service of a UE is determined, and
- a second receiving component, configured to receive a response corresponding to the second request, wherein the response comprises Internet Protocol, IP, address information of the UE.

According to a third embodiment of the disclosure, there is provided a communication device in a network, comprising: a storage adapted to store instructions therein and a processor adapted to execute the instructions to cause the communication device to perform the steps of any of the methods herein.

According to a fourth embodiment of the disclosure, there is provided one or more computer-readable storage storing computer-executable instructions thereon, when executed by a computing device, causing the computing device to implement the method of any of any of the methods herein.

According to a fifth embodiment of the disclosure, there is provided a computer program, comprising instructions which, when executed on at least one processor, cause the at least one processor to carry out the method according to any one of the methods herein.

According to a six embodiment of the disclosure, there is provided a carrier containing the computer program of the eighth embodiment, wherein the carrier is one of an electronic signal, optical signal, radio signal, or computer readable storage.

According to a seventh embodiment of the disclosure, there is provided an apparatus adapted to perform the method according to any one of the methods herein.

The UE service management network element in the disclosure is a network function element, and may provide service management for a UE, for example a network function element in 5G core or NG core, such as SMF. The communication network herein may be a 5G network, a 5G network in combination with a 4G network, or any other appropriate network.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and details through use of the accompanying drawings.

DETAILED DESCRIPTION

Figure 1:
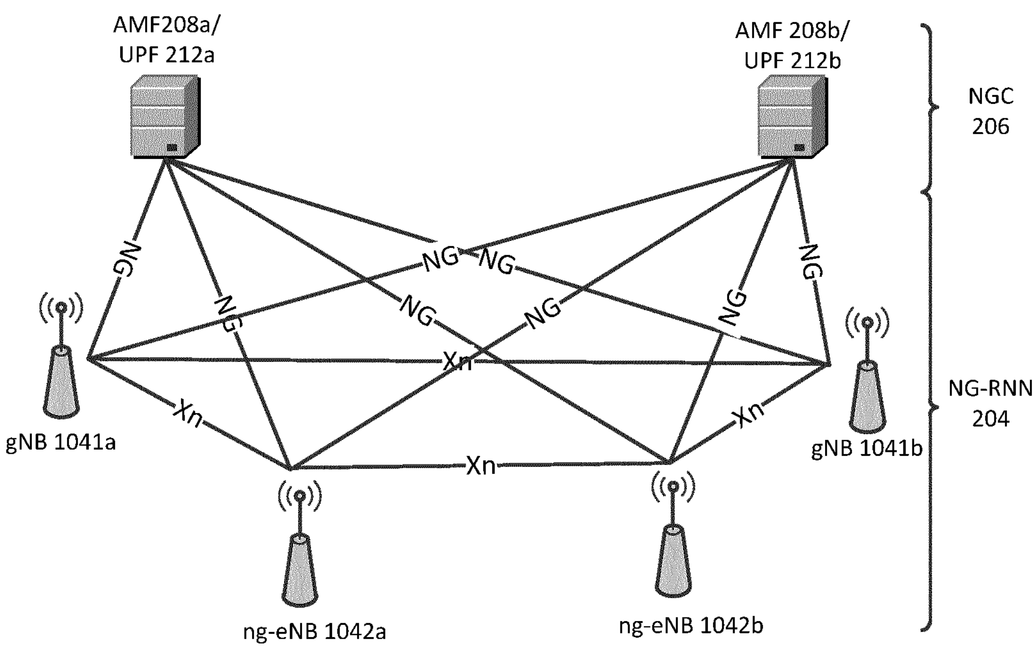
FIG. 1 illustrates a high-level view of an exemplary 5G network architecture where embodiments of the present disclosure may apply.

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

The terms “A or B,” “at least one of A or/and B,” or “one or more of A or/and B” as used herein include all possible combinations of items enumerated with them. For example, “A or B,” “at least one of A and B,” or “at least one of A or B” means (1) including at least one A, (2) including at least one B, or (3) including both at least one A and at least one B.

The terms such as “first” and “second” as used herein may use corresponding components regardless of importance or an order and are used to distinguish a component from another without limiting the components. These terms may be used for the purpose of distinguishing one element from another element. For example, a first request and a second request indicates different requests regardless of the order or importance.

The expression “configured to (or set to)” as used herein may be used interchangeably with “suitable for,” “having the capacity to,” “designed to,” “adapted to,” “made to,” or “capable of” according to a context. The term “configured to (set to)” does not necessarily mean “specifically designed to” in a hardware level. Instead, the expression “apparatus configured to . . . ” may mean that the apparatus is “capable of . . . ” along with other devices or parts in a certain context. For example, “a processor configured to (set to) perform A, B, and C” may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein, for example, concepts of AMF, SMF, etc. are generally understood in the context of 3GPP specifications. Though many embodiments herein are described in the context of Next Generation network (such as 5G mobile wireless networks), other networks may also be applicable.

Even though many embodiments are described in the context of I-SMF insertion or change, it is noted that embodiments of the present disclosure are not limited to I-SMF, but also applicable to other NF as appropriate.

It is noted that “address/prefix” and “address” are both used herein, it will be understood they refer to the same thing and can be exchangeable, as prefix is a kind of address. Similarly, the “IP address information” may comprise the IP address, including the IP prefix, etc.

FIG. 1 illustrates a high-level view of an exemplary NG (such as 5G mobile wireless) network architecture where embodiments of the present disclosure may apply, including a Next Generation Radio Access Network (NG-RAN) 104 and a NG Core (NGC) 106. As shown in the figure, NG-RAN 104 can include gNBs 1041 (e.g., 1041*a*, 1041*b*) and ng-eNBs 1042 (e.g., 1042*a*, 1042*b*) that are interconnected with each other via respective Xn interfaces. The gNBs and ng-eNBs are also connected via the NG interfaces to NGC 106, more specifically to the AMF (Access and Mobility Management Function) 208 (e.g., AMFs 208*a*, 208*b*) via respective NG-C interfaces and to the UPF (User Plane Function) 212 (e.g., UPFs 212*b*, 212*a*) via respective NG-U interfaces.

Each of the gNBs 1041 can support the NR radio interface, including frequency division duplexing (FDD), time division duplexing (TDD), or a combination thereof. In contrast, each of ng-eNBs 1042 supports the LTE radio interface but, unlike conventional LTE eNBs (such as shown in FIG. 1), connect to the NGC via the NG interface.

Deployments based on different 3GPP architecture options (e.g., EPC-based or 5GC-based) and UEs with different capabilities (e.g., EPC NAS and 5GC NAS) may coexist at the same time within one network (e.g., PLMN). It is generally assumed that a UE that can support 5GC NAS procedures can also support EPC NAS procedures to operate in legacy networks, such as when roaming. As such, the UE will use EPC NAS or 5GC NAS procedures depending on the core network (CN) by which it is served.

Another change in NG networks (e.g., in 5GC) is that traditional peer-to-peer interfaces and protocols (e.g., those found in LTE/EPC networks) are modified by a so-called Service Based Architecture (SBA) in which Network Functions provide one or more services to one or more service consumers. This can be done, for example, by Hyper Text Transfer Protocol/Representational State Transfer (HTTP/REST) application programming interfaces (APIs).

The services are composed of various “service operations”, which are more granular divisions of the overall service functionality. In order to access a service, both the service name and the targeted service operation must be indicated. The interactions between service consumers and producers can be of the type “request/response” or “subscribe/notify”. In the 5G SBA, network repository functions (NRF) allow every network function to discover the services offered by other network functions, and Data Storage Functions (DSF) allow every network function to store its context.

This architecture model, which further adopts principles like modularity, reusability and self-containment of network functions, can enable deployments to take advantage of the latest virtualization and software technologies.

Figure 2:
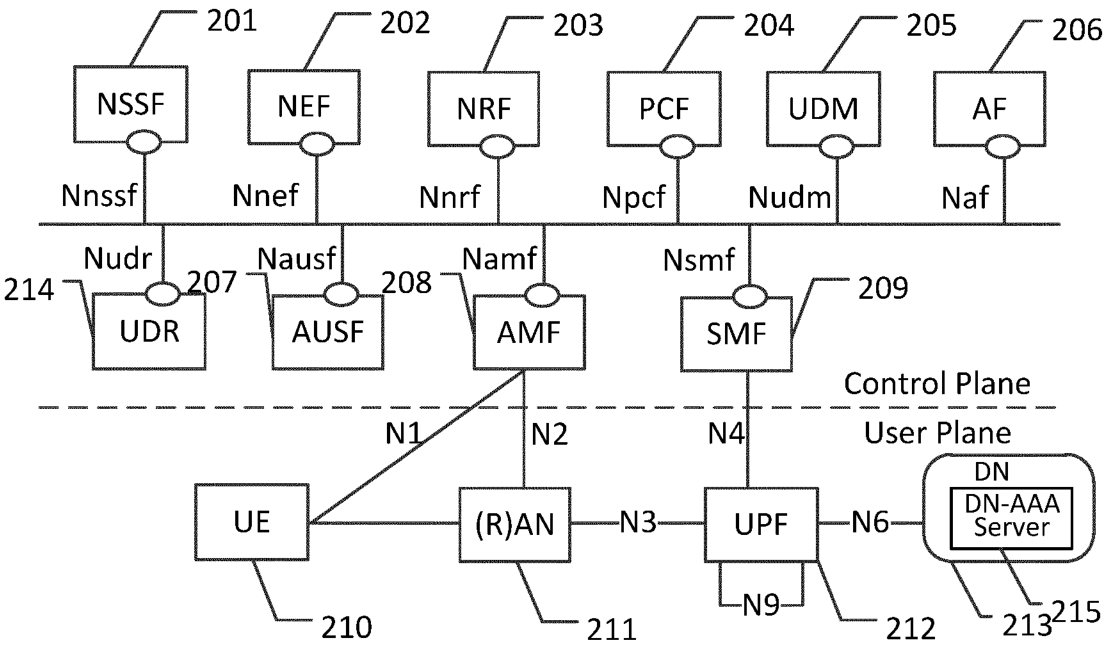
FIG. 2 illustrates a service-based architecture for an exemplary non-roaming 5G or Next Generation Core Network.

FIG. 2 illustrates a service-based architecture for an exemplary non-roaming 5G or Next Generation Core Network (5GCN/NGCN/NCN). This illustration depicts logical connections between nodes and functions, and its illustrated connections should not be interpreted as direct physical connections. UE 210 forms a radio access network connection with a (Radio) Access Network ((R)AN) node 211 (which may, for example, be an gNodeB (gNB)), which is connected to a CN User Plane (UP) Function (UPF) 212 such as a UP Gateway over a network interface providing a defined interface such as an N3 interface. UPF 212 provides a logical connection to a Data Network (DN) 213 over a network interface such as an N6 interface. The radio access network connection between the UE 210 and the (R)AN node may be referred to as a Data Radio Bearer (DRB).

DN 213 may be a data network used to provide an operator service, or it may be outside the scope of the standardization of the Third Generation Partnership Project (3GPP), such as the Internet, a network used to provide third party service, and in some embodiments DN 213 may represent an Edge Computing network or resource, such as a Mobile Edge Computing (MEC) network.

UE 210 also connects to the Access and Mobility Management Function (AMF) 208 through a logical N1 connection (although the physical path of the connection is not direct). The AMF 208 is responsible for authentication and authorization of access requests, as well as mobility management functions. The AMF 208 may perform other roles and functions as defined by the 3GPP Technical Specification (TS) 23.501. In a service based view, AMF 208 can communicate with other core network control plane functions through a service based interface denoted as Namf.

The Session Management Function (SMF) 209 is a network function that is responsible for the allocation and management of IP addresses that are assigned to an ED as well as the selection of a UPF 212 (or a particular instance of a UPF 212) for traffic associated with a particular session of UE 210. It will be appreciated that there will typically be multiple SMFs 209 in the network 226, each of which may be associated with a respective group of UEs 210, (R)AN nodes 211 or UPFs 212. The SMF 209 can communicate with other core network functions, in a service based view, through a service based interface denoted as Nsmf. The SMF 209 may also connect to a UPF 212 through a logical interface such as network interface N4. There is also the possibility to use an SMF as an Intermediate SMF (I-SMF). I-SMF is an SMF that is inserted to support a PDU session as the UE is located in an area which cannot be controlled by the original SMF because the UPF(s) belong to a different SMF Service Area.

The Authentication Server Function (AUSF) 207, provides authentication services to other network functions over a service based Nausf interface.

A Network Exposure Function (NEF) 202 can be deployed in the network to allow servers, functions and other entities such as those outside a trusted domain to have exposure to services and capabilities within the network. In one such example, an NEF 202 can act much like a proxy between an application server outside the illustrated network and network functions such as the Policy Control Function (PCF) 204, the SMF 209, the UDM 205, and the AMF 208, so that the external application server can provide information that may be of use in the setup of the parameters associated with a data session. The NEF 202 can communicate with other network functions through a service based Nnef network interface. The NEF 202 may also have an interface to non-3GPP functions.

A Network Repository Function (NRF) 203, provides network element discovery functionality. The NRF 203 may be specific to the Public Land Mobility Network (PLMN) or network operator, with which it is associated. The service discovery functionality can allow network functions and UEs connected to the network to determine where and how to access existing network functions, and may present the service based interface Nnrf.

PCF 204 communicates with other network functions over a service based Npcf interface, and can be used to provide policy and rules to other network functions, including those within the control plane. Enforcement and application of the policies and rules is not necessarily the responsibility of the PCF 204, and is instead typically the responsibility of the functions to which the PCF 204 transmits the policy. In one such example the PCF 204 may transmit policy associated with session management to the SMF 209. This may be used to allow for a unified policy framework with which network behavior can be governed.

A Unified Data Management Function (UDM) 205 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 205 may employ an interface, such as Nudr to connect to a User Data Repository (UDR) 214. The PCF 204 may be associated with the UDM 205 because it may be involved with requesting and providing subscription policy information to the UDR 214, but it should be understood that typically the PCF 204 and the UDM 205 are independent functions.

The PCF 204 may have a direct interface to the UDR 214 or can use Nudr interface to connect with UDR 214. The UDM 205 can receive requests to retrieve content stored in the UDR 214, or requests to store content in the UDR 214. The UDM 205 is typically responsible for functionality such as the processing of credentials, location management and subscription management. The UDR 214 may also support any or all of Authentication Credential Processing, User Identification handling, Access Authorization, Registration/Mobility management, subscription management, and Short Message Service (SMS) management. The UDR 214 is typically responsible for storing data provided by the UDM 205. The stored data is typically associated with policy profile information (which may be provided by PCF 204) that governs the access rights to the stored data. In some embodiments, the UDR 214 may store policy data, as well as user subscription data which may include any or all of subscription identifiers, security credentials, access and mobility related subscription data and session related data.

The Application Function (AF) 206 represents the non-data plane (also referred to as the non-user plane) functionality of an application deployed within a network operator domain and within a 3GPP compliant network. The AF 206 interacts with other core network functions through a service based Naf interface, and may access network capability exposure information, as well as provide application information for use in decisions such as traffic routing. The AF 206 can also interact with functions such as the PCF 204 to provide application specific input into policy and policy enforcement decisions. It should be understood that in many situations the AF 206 does not provide network services to other NFs, and instead is often viewed as a consumer or user of services provided by other NFs. An application outside the 3GPP network, can perform many of the same functions as AF 206 through the use of NEF 202.

The UE 210 communicates with network functions that are in the User Plane (UP), and the Control Plane (CP). The UPF 212 is a part of the CN UP (DN 213 being outside the 5GCN). (R)AN node 211 may be considered as a part of a User Plane, but because it is not strictly a part of the CN, it is not considered to be a part of the CN UP or UPF 212. AMF 208, SMF 209, AUSF 207, NEF 202, NRF 203, PCF 204, and UDM 205 are functions that reside within the CN CP, and are often referred to as Control Plane Functions. AF 206 may communicate with other functions within CN CP (either directly or indirectly through the NEF 202), but is typically not considered to be a part of the CN CP.

The DN-AAA server 215 may belong to the 5GC (not shown) or to the DN. The DN-AAA server performs authentication and authorization. The response (when positive) may contain network information, such as an IPv4 address and/or IPv6 prefix for the user when the SMF 209 is interworking with the DN-AAA server. If in the DN, the DN-AAA server will communicate with SMF 209 via the UPF 212, and if in the 5GC, the DN-AAA server will communicate with SMF 209 directly.

Figure 3A:
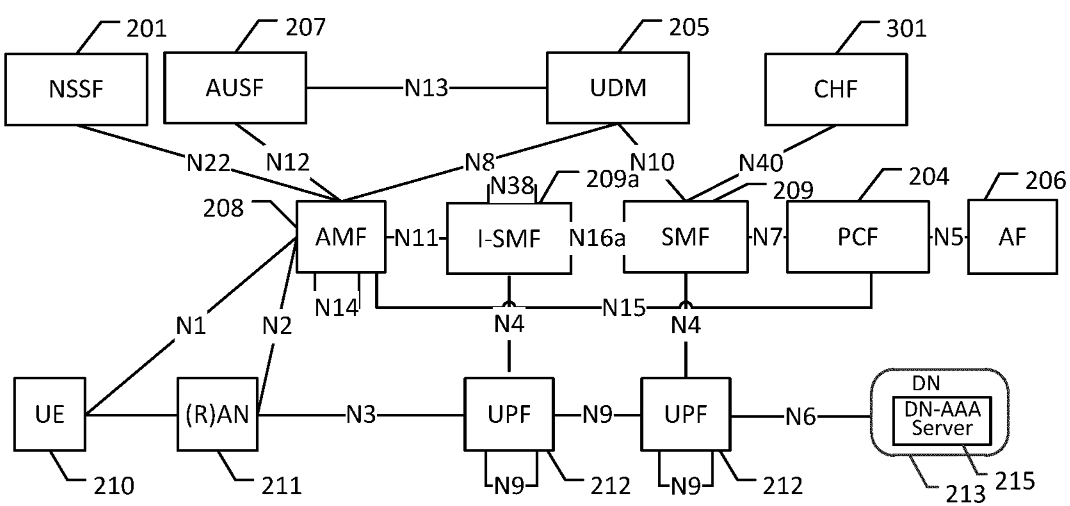
FIGS. 3*a*-3*c* illustrate scenarios where embodiments of the present disclosure may apply.
Figure 3B:
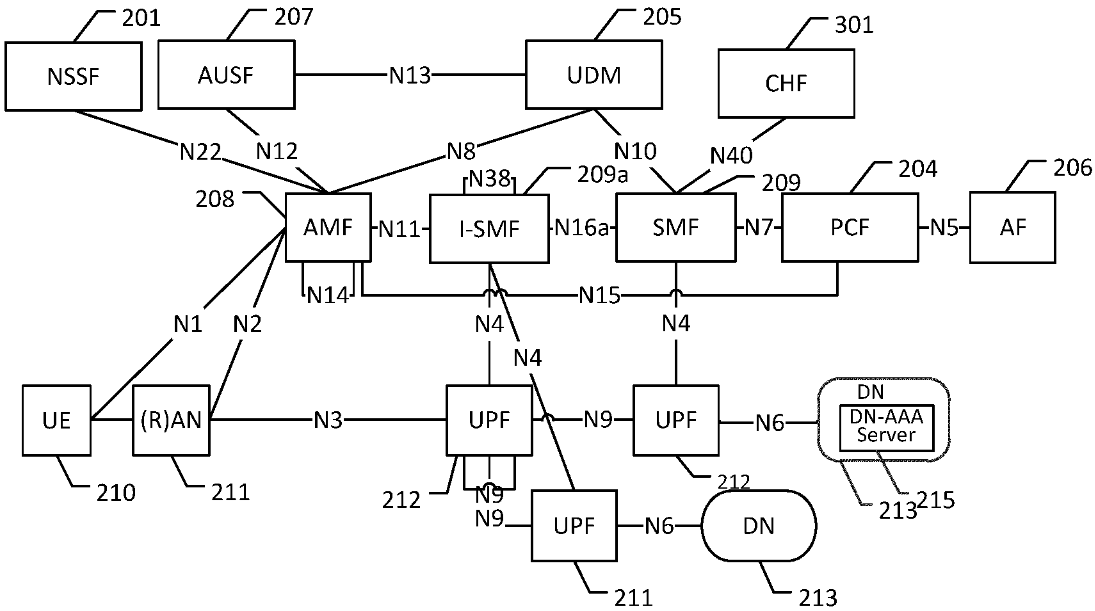
Figure 3C:
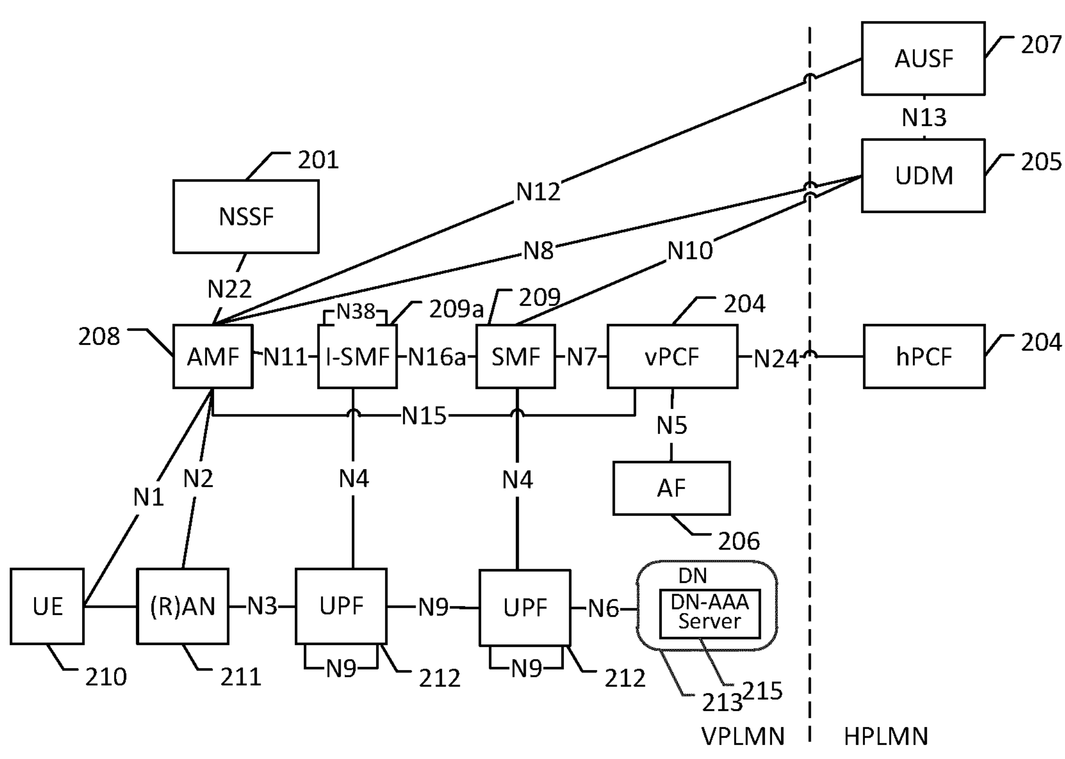

There are also other network functions existed in the 5GC but not illustrated in FIG. 2 but illustrated in FIG. 3*a*-3*c*, such as CHarging Function (CHF) 301 which is responsible for charging and Network Slice Specific Authentication and Authorization Function (NSSAAF) 302 which supports Network Slice-Specific Authentication and Authorization with a AAA Server (AAA-S). Reference point between SMF and the CHF is N40. Reference point between AMF and the NSSAAF is N58. Reference point between UDM and the NSSAAF is N59.

Those skilled in the art will appreciate that there may be a plurality of UPFs connected in series between the (R)AN node 211 and the DN 213, and multiple data sessions to different DNs can be accommodated through the use of multiple UPFs in parallel.

FIGS. 3*a*-3*c* illustrate architectures with I-SMF existed therein in different scenarios of an exemplary roaming 5G or Next Generation Core Network, wherein FIG. 3*a* illustrates non-roaming architecture with I-SMF insertion to the PDU Session in reference point representation, with no Uplink Classifier/Branching Point (UL-CL/BP), FIG. 3*b* illustrates non-roaming architecture with I-SMF insertion to the PDU Session in reference point representation, with UL-CL/BP, and FIG. 3*c* illustrates roaming 5G System architecture with SMF/I-SMF—local breakout scenario in reference point representation. As shown in FIG. 3*a*-3*c*, each SMF 209 (including I-SMF 209*a*) may connect to a UPF 212 through a logical interface such as network interface N4, N16a is the interface between SMF and I-SMF, and N38 is the interface between I-SMFs. In roaming scenario of FIG. 3*c*, the SMF controlling the UPF connecting to NG-(R)AN is separated from the SMF controlling PDU Session anchor. Architectures with I-SMF change are similar to Architectures with I-SMF insertion in those scenarios, except a new I-SMF is added.

As mentioned above, Intermediate SMF (I-SMF) is an SMF that is inserted to support a PDU session as the UE is located in an area which cannot be controlled by the original SMF because the UPF(s) belong to a different SMF Service Area.

The AMF is responsible of detecting when to add or to remove an I-SMF for a PDU Session. For this purpose, the AMF gets from NRF information about the Service Area of SMF(s). During mobility events such as Hand-Over or AMF change, if the service area of the SMF does not include the new UE location, then the AMF selects and inserts an I-SMF which can serve the UE location and the S-NSSAI. Conversely if the AMF detects that an I-SMF is no more needed (as the service area of the SMF includes the new UE location) it removes the I-SMF and interfaces directly with the SMF of the PDU Session. If the AMF detects that the SMF cannot serve the UE location (e.g. due to mobility), then the AMF selects a new I-SMF serving the UE location. If the existing I-SMF cannot serve the UE location (e.g. due to mobility) and the service area of the SMF does not include the new UE location (or the PDU Session is Home Routed), then the AMF initiates an I-SMF change. At PDU Session Establishment in non-roaming and roaming with LBO scenarios, if the AMF or SCP cannot select an SMF with a Service Area supporting the current UE location for the selected (DNN, S-NSSAI) and required SMF capabilities, the AMF selects an SMF for the selected (DNN, S-NSSAI) and required capabilities and in addition selects an I-SMF serving the UE location and the S-NSSAI.

In User Equipment (UE) IP address management in 5G network, for IPv4 or IPv6 or IPv4v6 PDU Session Type, during PDU Session Establishment procedure, if the static IP address/prefix is stored in the UDM, the SMF retrieves this static IP address/prefix from the UDM. if UE IP address/prefix was not already allocated and provided to PCF, the SMF may receive a Subscribers IP Index instead from the PCF. The Subscribers IP Index indicates what allocation method (e.g. a specific IP pool, an external server such as DN-AAA server, etc.) should be used for IP address/prefix allocation for the UE. The SMF may use this to assist in selecting how the IP address/prefix is to be allocated when multiple allocation methods, or multiple instances of the same method are supported. It is transparent to the UE whether the PLMN or the external data network allocates the IP address.

The multiple allocation methods comprise: the SMF allocates the IP address from a pool that corresponds to the PDU Session Anchor (UPF) that has been selected; the UE IP address is obtained from the UPF. In that case the SMF shall interact with the UPF via N4 procedures to obtain a suitable IP address. The SMF provides the UPF with the necessary information allowing the UPF to derive the proper IP address (e.g. the network instance); in the case that the UE IP address is obtained from the external data network, additionally, the SMF shall also send the allocation, renewal and release related request messages to the external data network, i.e. DHCP/DN-AAA server, and maintain the corresponding state information. The IP address/prefix allocation request sent to DHCP/DN-AAA server may include the IP address pool ID to identify which range of IP address is to be allocated. In this case the SMF is provisioned with separate IP address pool ID(s), and the mapping between IP address pool ID and UPF Id, DNN, S-NSSAI, IP version. The provision is done by OAM or during the N4 Association Setup procedure.

A PDU Session may be associated with multiple IPv6 prefixes. This is referred to as multi-homed PDU Session. The multi-homed PDU Session provides access to the Data Network via more than one PDU Session Anchor. The different user plane paths leading to the different PDU Session Anchors branch out at a “common” UPF referred to as a UPF supporting “Branching Point (BP)” functionality. The Branching Point provides forwarding of UL traffic towards the different PDU Session Anchors and merge of DL traffic to the UE i.e. merging the traffic from the different PDU Session Anchors on the link towards the UE.

The UPF supporting a BP functionality may also be controlled by the SMF to support traffic measurement for charging, traffic replication for LI and bit rate enforcement (Session-AMBR per PDU Session). The insertion and removal of a UPF supporting Branching Point is decided by the SMF and controlled by the SMF using generic N4 and UPF capabilities. The SMF may decide to insert in the data path of a PDU Session a UPF supporting the Branching Point functionality during or after the PDU Session Establishment, or to remove from the data path of a PDU Session a UPF supporting the Branching Point functionality after the PDU Session Establishment.

Multi homing of a PDU Session applies only for PDU Sessions of IPv6 type. When the UE requests a PDU Session of type "IPv4v6" or "IPv6" the UE also provides an indication to the network whether it supports a Multi-homed IPv6 PDU Session.

Figure 4A:
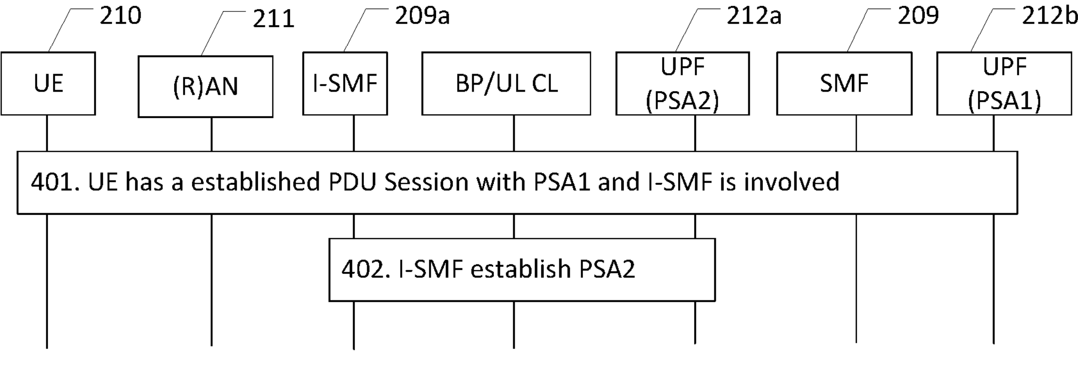
FIG. 4*a* illustrates addition of PDU Session Anchor controlled by I-SMF.

FIG. 4*a* illustrates addition of PDU Session Anchor controlled by I-SMF. At step 401, UE 210 establishes a PDU Session with a UPF 212*a* including the PDU Session Anchor 1, which is controlled by SMF 209, and the I-SMF 209*a* and an I-UPF controlled by I-SMF 209*a* are inserted for the PDU Session. At some point, using the list of DNAI(s) of interest for this PDU Session received from the SMF, the I-SMF 209*a* decides to establish a new PDU Session Anchor e.g. due to UE mobility. So at step 402, the I-SMF 209*a* selects a UPF 212*b* and using N4 establishes the new PDU Session Anchor 2 (PSA2) of the PDU Session.

It is noted that during step 402, in the case of IPv6 multi-homing applies to the PDU Session, a new IPv6 prefix corresponding to PSA2 is allocated by the I-SMF or by the UPF 212*b* supporting the PSA2.

However, as mentioned above, it is the SMF 209 that receives the Subscribers IP Index from the PCF, the I-SMF 209*a* has no idea of the Subscribers IP Index. If incorrect allocation method is used for IPv6 prefix allocation by the I-SMF, the IPv6 multi-homing may not work.

It is also noted that as I-SMF 209*a* cannot request the DN-AAA server 215 for address/prefix allocation, as it has no idea of the address information of the DN-AAA server and thus cannot communicate with the DN-AAA server.

Figure 4B:
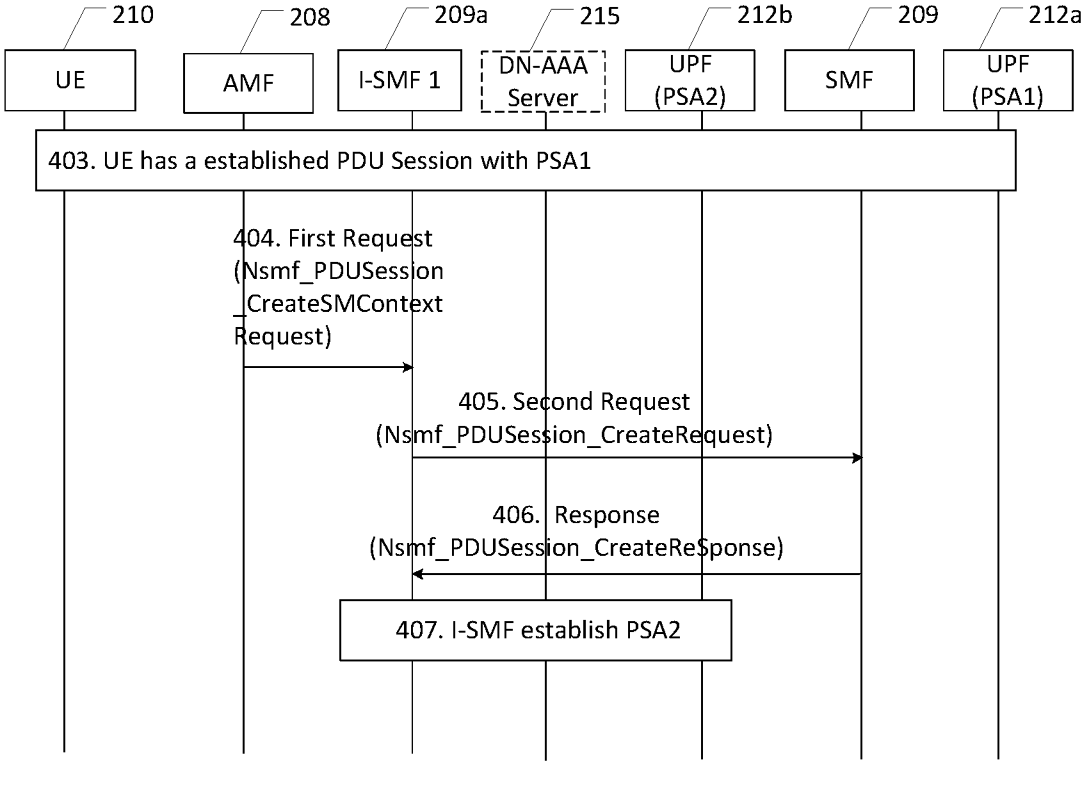
FIG. 4*b* illustrates an I-SMF insertion procedure according to embodiments of the present disclosure.

FIG. 4*b* illustrates an I-SMF insertion procedure according to embodiments of the present disclosure.

At step 403, UE 210 establishes a PDU Session with a UPF 212*a* including the PDU Session Anchor 1, which is controlled by SMF 209.

At step 404, if the AMF 208 has selected an I-SMF1 209*a*, the AMF 208 sends a first request to the I-SMF1 209*a*, to request insertion of the I-SMF1 209*a* as an I-SMF for the PDU Session. The first request may be e.g. an Nsmf_PDUSession_CreateSMContext Request according to 3GPP specifications, which comprises PDU Session ID, SM Context ID, UE location info, Access Type, RAT Type, Operation Type, etc. The SM Context ID points to SMF 209.

At step 405, the I-SMF1 209*a* invokes a second request for creating the PDU Session for it. The second request may be e.g. an Nsmf_PDUSession_Create Request according to 3GPP specifications, which comprises new I-UPF DL tunnel information, new I-UPF tunnel endpoint for buffered DL data, SM Context ID at I-SMF1 209*a*, Access Type, RAT type, DNAI list supported by the I-SMF1 209*a*, etc.

The SMF 209 will do a couple of actions for creating the PDU Session with the received parameters and at step 406, responds to the I-SMF1 209*a* with a response, e.g. an Nsmf_PDUSession_Create Response according to 3GPP specifications, which comprises the DNAI(s) of interest for this PDU Session, Tunnel Info at UPF(PSA) for UL data if it is allocated, etc., but a new element, if available, will be added in the response, i.e., Internet Protocol, IP, address information of the UE, such as Subscribers IP Index will be added. The premise of the new element being available may be e.g. that some other NF(s) (such as PCF) has sent the IP address information of the UE to the SMF 209 (such as during SM Policy Creation procedure). The Subscribers IP Index comprises IPv6 prefix. The received IP address information can be used for further address-related allocation by the I-SMF 209*a*.

Additionally or alternatively, in case that the IP address information indicates that an external network element (such as a DN-AAA server) is used for address/prefix allocation, the response sent from the SMF 209 to the I-SMF 209*a* further comprise address information of the external network element, so that the I-SMF 209*a* can retrieve the allocated address/prefix by itself.

At some point, using the list of DNAI(s) of interest for this PDU Session received from the SMF 209, the I-SMF 209*a* decides to establish a new PDU Session Anchor e.g. due to UE mobility. At step 407, the I-SMF 209*a* selects a UPF 212*b* and using N4 establishes the new PDU Session Anchor 2 (PSA2) of the PDU Session. During this step, in the case of IPv6 multi-homing applies to the PDU Session, the I-SMF 209*a* may use the IPv6 prefix received at step 405 for allocation of a new IPv6 prefix corresponding to PSA2. Similar method goes to more than one new PSA2s. In case that an external network element is used for the address/prefix allocation, the I-SMF 209*a* may retrieve the allocated address/prefix from the external network element using the address information of the external network element by itself. In this way, the IPv6 index may be consistent among SMFs, and the IPv6 multi-homing may thus work properly, and by notifying the I-SMF address information of the external network element, the way of address/prefix allocation by an external network element is enabled at the I-SMF.

Figure 4C:
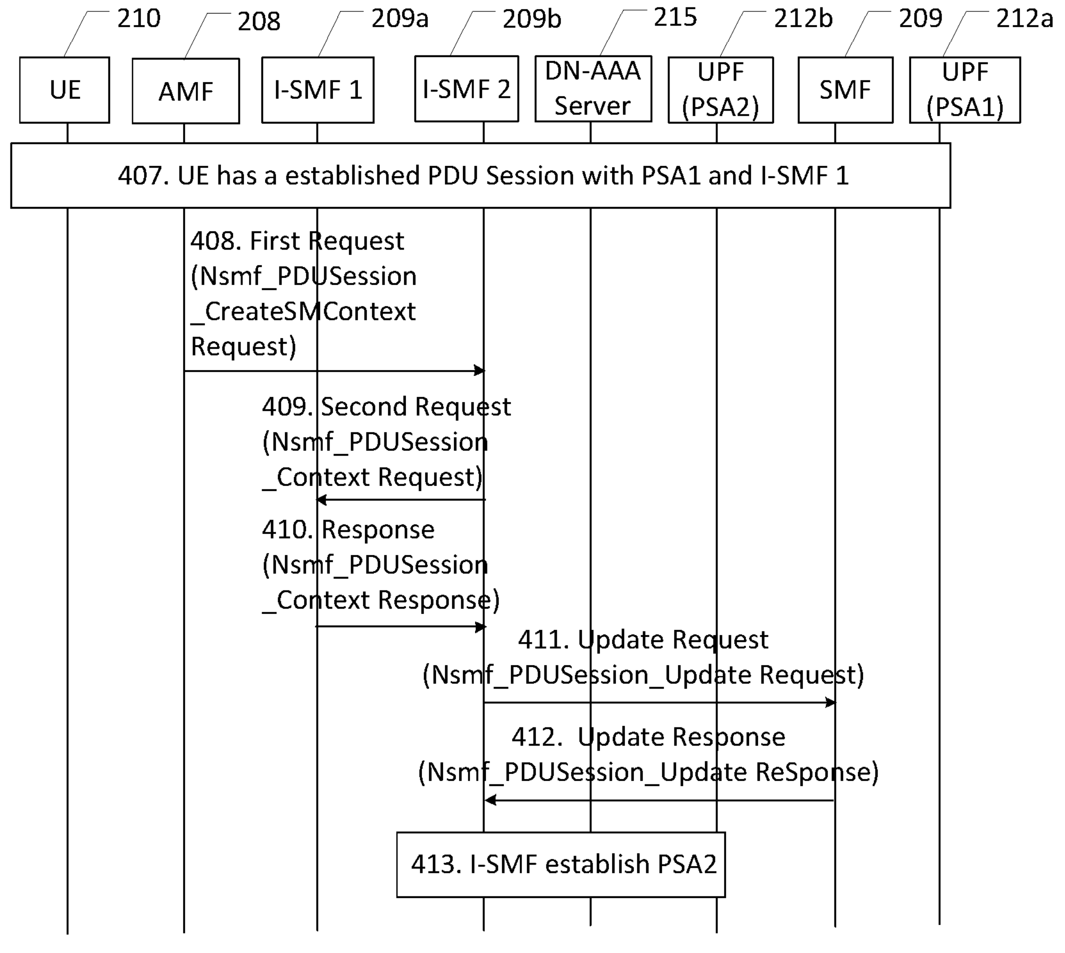
FIG. 4*c* illustrates an I-SMF change procedure according to embodiments of the present disclosure.

FIG. 4*c* illustrates an I-SMF change procedure according to embodiments of the present disclosure.

At Step 408, UE 210 established a PDU Session with a UPF 212*a* including the PDU Session Anchor 1, which is controlled by SMF 209. The I-SMF 209*a* and an I-UPF controlled by I-SMF 209*a* are inserted for the PDU Session.

At Step 408, if the AMF has selected a new I-SMF 209*b*, the AMF 208 sends a first request to the I-SMF1 209*a*, to request the I-SMF 209*b* to be an I-SMF for the PDU Session for a change, instead of I-SMF 209*a*. The first request may be e.g. an Nsmf_PDUSession_CreateSMContext Request according to 3GPP specifications, which comprises PDU Session ID, SM Context ID, UE location info, Access Type, RAT Type, Operation Type, etc. The SM Context ID points to the old I-SMF 209*a*.

At Step 409, the new I-SMF 209*b* retrieves SM Context from the old I-SMF 209*a* by invoking a second request for retrieving UE service management context. The second request may be e.g. an Nsmf_PDUSession_Context Request according to 3GPP specifications, which comprises SM context type, SM Context ID, etc. The new I-SMF 209*b* uses SM Context ID received from AMF 208 for this service operation. SM Context ID is used by the recipient of Nsmf_PDUSession_Context Request in order to determine the targeted PDU Session. SM context type indicates that the requested information is all SM context, i.e. PDN Connection Context and 5G SM context.

At step 410, the old I-SMF 209*a* responds with the SM context of the indicated PDU Session in a response, e.g.

Nsmf_PDUSession_Context Response. The SM context in the response may comprise, if available, Internet Protocol, IP, and address information of the UE, such as Subscribers IP Index. The premise of the IP address information of the UE being available may be e.g. that some other NF(s) (such as SMF 209) has sent the IP address information of the UE to the old I-SMF 209*a*. The Subscribers IP Index comprises IPv6 prefix. The received IP address information can be used for further address-related allocation by the new I-SMF 209*b*.

Additionally or alternatively, in case that the IP address information indicates that an external network element (such as a DN-AAA server) is used for address/prefix allocation, the response sent from the old SMF 209*a* to the new I-SMF 209*b* further comprises address information of the external network element, so that the I-SMF 209*b* can retrieve the allocated address/prefix by itself.

At step 411, the new I-SMF 209*b* invokes an update request towards the SMF 209, the update request may be e.g. an Nsmf_PDUSession_Update Request according to 3GPP specifications, which comprises SM Context ID, new I-UPF DL tunnel information, SM Context ID at I-SMF 209*b*, Access Type, RAT Type, DNAI list supported by the new I-SMF 209*b*, and the IP address information, etc.

At step 412, the SMF responds to the new I-SMF 209*b* with an update response, the update response may be e.g. an Nsmf_PDUSession_Update Response which comprises the DNAI(s) of interest for this PDU Session.

At some point, using the list of DNAI(s) of interest for this PDU Session received from the SMF 209, the I-SMF 209*a* decides to establish a new PDU Session Anchor e.g. due to UE mobility. At step 413, the I-SMF 209*b* selects a UPF 212*b* and using N4 establishes the new PDU Session Anchor 2 (PSA2) of the PDU Session. During this step, in the case of IPv6 multi-homing applies to the PDU Session, the I-SMF 209*b* may use the IPv6 prefix received at step 410 for allocation of a new IPv6 prefix corresponding to PSA2. Similar method goes to more than one new PSA2s. In case that an external network element is used for the address/prefix allocation, the I-SMF 209*a* may retrieve the allocated address/prefix from the external network element using the address information of the external network element by itself. In this way, the IPv6 index may be consistent among SMFs, and the IPv6 multi-homing may thus work properly, and by notifying the new I-SMF address information of the external network element, the way of address/prefix allocation by an external network element is enabled at the new I-SMF.

Figure 5:
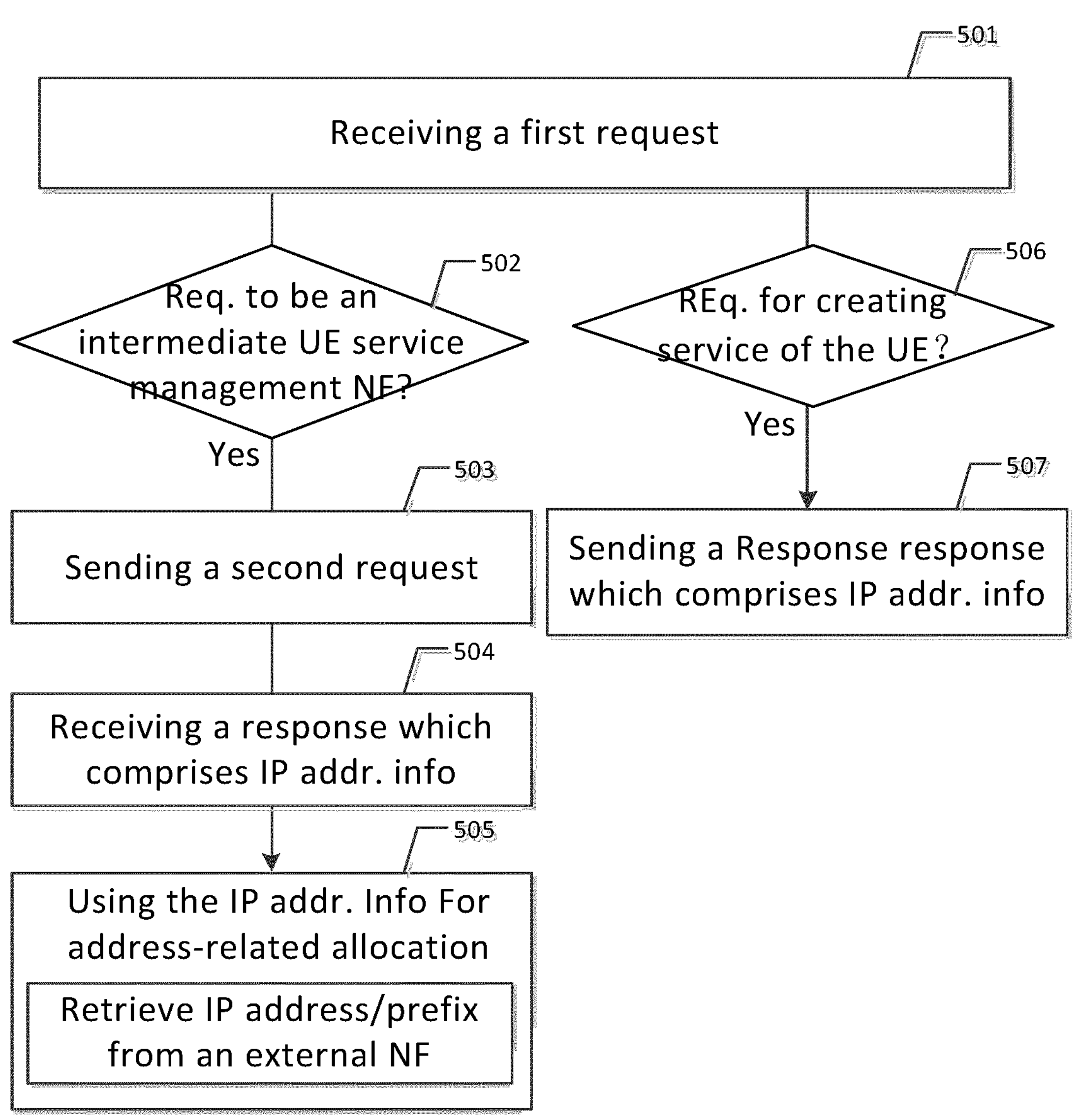
FIG. 5 illustrates a flowchart of an embodiment for a UE service management network element according to embodiments of the present disclosure.

FIG. 5 illustrates a flowchart of an embodiment for a UE service management network element according to embodiments of the present disclosure. In an example, the UE service management network element comprises an SMF network element. The SMF network element may simply play the role of an SMF for the UE, or may play the role of an I-SMF for the UE. This flowchart illustrates flowcharts in both cases. and the communication network here may be a 5G network, a 5G network in combination with a 4G network, or any other appropriate network.

At step 501, the UE service management network element receives a first request. Then it determines at step 502 whether the first request is to request the UE service management network element to be an intermediate UE service management network element for a service of the UE, if the answer is yes, the flowchart proceeds to step 503 to send a second request to another UE service management network element indicated in the first request, and may receive a response corresponding to the second request at step 504, wherein the response may comprise Internet Protocol, IP, address information of the UE.

In an embodiment, the first request is to request insertion of the UE service management network element as the intermediate UE service management network element for the service of the UE, e.g. e.g. an Nsmf_PDUSession_CreateSMContext Request according to 3GPP specifications, and the second request is a request for creating the service of the UE, e.g. an Nsmf_PDUSession_Create Request according to 3GPP specifications. More details may be found in steps 404 and 405 described above and will not be iterated herein. In this embodiment, the response corresponding to the second request received at step 504, e.g. an Nsmf_PDUSession_Create Response according to 3GPP specifications, which comprises the DNAI(s) of interest for this PDU Session, Tunnel Info at UPF(PSA) for UL data if it is allocated, etc., but a new element may be added in the response if available, i.e., Internet Protocol, IP, address information of the UE, such as Subscribers IP Index may be added. The Subscribers IP Index comprises IPv6 prefix. The received IP address information can be used for further address-related allocation by the UE service management network element. In case that the IP address information indicates that an external network element (such as a DN-AAA server) is used for address/prefix allocation, the response further comprises address information of the external network element (such as the DN-AAA server), so that the UE service management network element can retrieve the allocated address/prefix from the external network element (such as the DN-AAA server) by itself.

In an embodiment, the first request is to request the UE service management network element to be the intermediate UE service management network element for the service of the UE for a change, e.g. an Nsmf_PDUSession_CreateSMContext Request according to 3GPP specifications, and the second request is a request for retrieving UE service management context, e.g. an Nsmf_PDUSession_Context Request according to 3GPP specifications. More details may be found in steps 408 and 409 described above and will not be iterated herein. In this embodiment, the response corresponding to the second request received at step 504, e.g. e.g. a Nsmf_PDUSession_Context Response. The SM context in the response may comprise, if available, Internet Protocol, IP, and address information of the UE, such as Subscribers IP Index. The Subscribers IP Index comprises IPv6 prefix. The received IP address information can be used for further address-related allocation by the UE service management network element. In case that the IP address information indicates that an external network element (such as a DN-AAA server) is used for address/prefix allocation, the response further comprises address information of the external network element (such as the DN-AAA server), so that the UE service management network element can retrieve the allocated address/prefix from the external network element (such as the DN-AAA server) by itself.

Then at step 505, the UE service management network element may use the IP address information for further address-related allocation, e.g. in the case of IPv6 multi-homing applies to the UE service such as PDU Session, the IPv6 prefix received may be used for allocation of one or more new UE service anchors (such as PDU Session Anchor 2 (PSA2)) of the UE service (such as PDU Session), and in case that IP address information indicates an external network element (such as a DN-AAA server) is used for address/prefix allocation, the address information of the DN-AAA server received may be used to retrieve the allocated address/prefix from the external network element (such as DN-AAA server).

In this way, the IP address information of the UE may be consistent among SMFs, and in a particular case of the IP address information being IPv6 prefix, the IPv6 multi-homing may work properly, and by receiving the new I-SMF address information of the external network element, the way of address/prefix allocation by an external network element is enabled at the receiving SMFs.

If the UE service management network element determines at step 506 that the first request is a request for creating the service of the UE, e.g. an Nsmf_PDUSession_Create Request according to 3GPP specifications, it will send a corresponding response comprising, if available, IP address information of the UE at step 507, the corresponding response is e.g. an Nsmf_PDUSession_Create Response according to 3GPP specifications, which comprises the DNAI(s) of interest for this PDU Session, Tunnel Info at UPF(PSA) for UL data if it is allocated, etc., but a new element will be added in the response, if available, i.e., Internet Protocol, IP, address information of the UE, such as Subscribers IP Index will be added. The Subscribers IP Index comprises IPv6 prefix. In case that the IP address information indicates that an external network element (such as a DN-AAA server) is used for address/prefix allocation, the corresponding response further comprises address information of the external network element (such as the DN-AAA server), so that the receiver of the corresponding response can retrieve the allocated address/prefix from the external network element (such as the DN-AAA server) by itself.

FIG. 6*a* illustrates a schematic block diagram of a UE service management network element operative in a communication network according to embodiments of the present disclosure. The UE service management network element may be a SMF, and the communication network here may be a 5G network, a 5G network in combination with a 4G network, or any other appropriate network.

The part of the UE service management network element 61 which is most affected by the adaptation of the herein described method, e.g., a part of the method described with reference to FIGS. 4*b*, 4*c* and 5, is illustrated as an arrangement 611, surrounded by a dashed line. The UE service management network element 61 and arrangement 611 may be further configured to communicate with other entities such as a network element of AMF via a communication component 612 which may also be regarded as part of the arrangement 611 (now shown). The communication component 612 comprises means for communication. The arrangement 611 or the UE service management network element 61 may further comprise a further functionality 614, such as functional components providing regular UE functions, and may further comprise one or more storage(s) 613.

The arrangement 611 could be implemented, e.g., by one or more of: a processor or a microprocessor and adequate software and memory for storing of the software, a Programmable Logic Device (PLD) or other electronic component (s) or processing circuitry configured to perform the actions described above, and illustrated, e.g., in FIGS. 4*b*, 4*c* and/or 5. The arrangement 611 of the UE service management network element may be implemented and/or described as follows.

Figure 6:
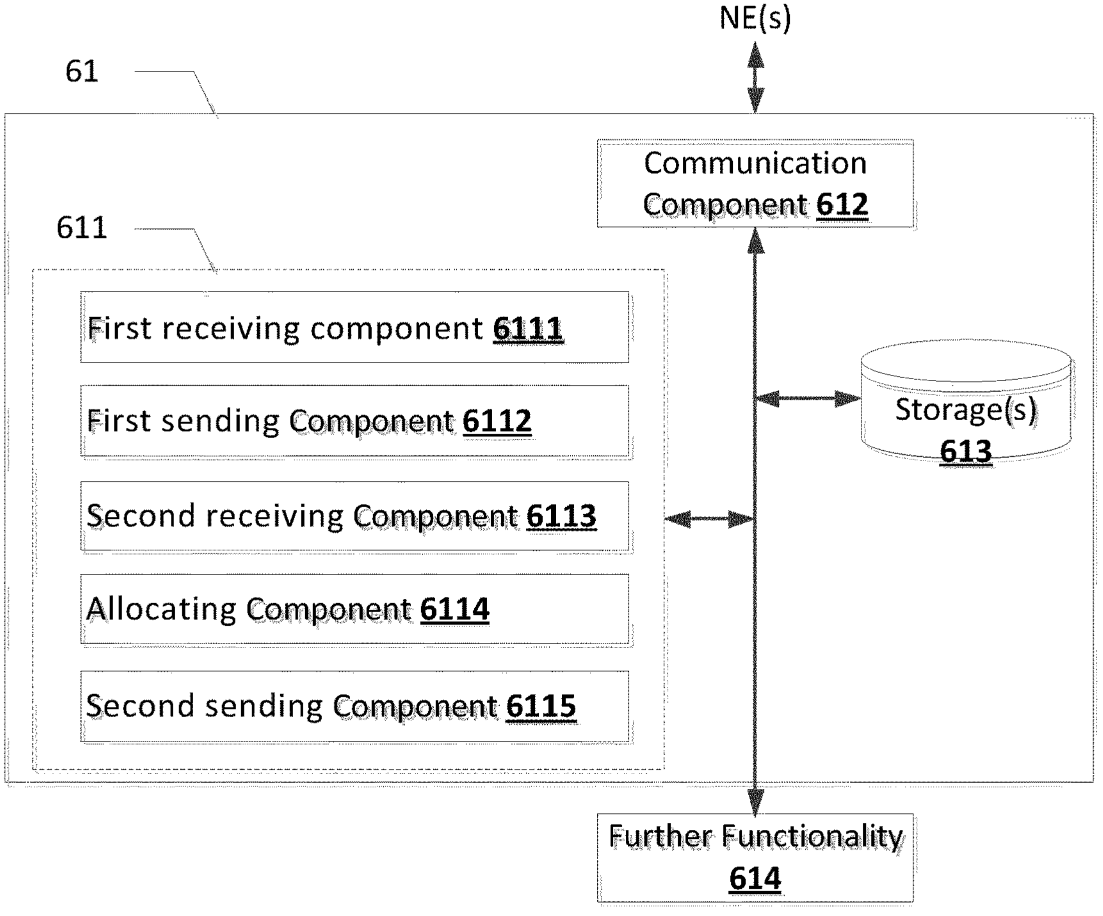
FIG. 6 illustrates a schematic block diagram of a UE service management network element according to embodiments of the present disclosure.

Referring to FIG. 6, the UE service management network element may comprise a first receiving component 6111, a first sending component 6112, a second receiving component 6113, an allocating component 6114, and a second sending component 6115.

The first receiving component 6111 is configured to receive a first request, details of the action may be found in step 501 as described above and will not be iterated herein.

The first sending component 6112 is configured to send a second request to another UE service management network element indicated in the first request in response to that the first request is to request the UE service management network element to be an intermediate UE service management network element for a service of a UE is determined, details of the action may be found in step 503 as described above and will not be iterated herein The second receiving component 6113 is configured to receive a response corresponding to the second request, wherein the response comprises Internet Protocol, IP, address information of the UE, and additionally or alternatively, the response comprises address information of an external network element in case that the IP address information of the UE indicates that the external network element is used for address/prefix allocation. Details of the action may be found in step 505 as described above and will not be iterated herein.

The allocating component 6114 is configured to use the IP address information for further address-related allocation, and additionally or alternatively, to use the address information of the external network element to retrieve the allocated address/prefix from the external network element. Details of the action may be found in step 505 as described above and will not be iterated herein.

The second sending component 6115 is configured to send a corresponding response comprising IP address information of the UE in response to that the first request is a request for creating the service of the UE is determined, and additionally or alternatively, the corresponding response comprises address information of an external network element in case that the IP address information of the UE indicates that the external network element is used for address/prefix allocation. Details of the action may be found in step 507 as described above and will not be iterated herein.

It should be noted that two or more different units in this disclosure may be logically or physically combined.

Figure 7:
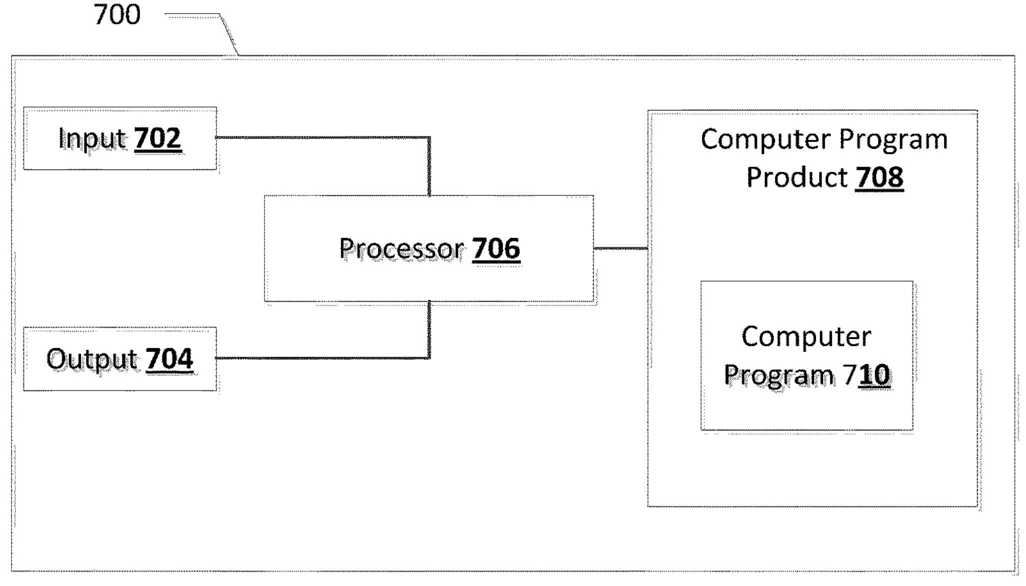
FIG. 7 schematically illustrates an embodiment of an arrangement which may be used for network elements of the present disclosure.

FIG. 7 schematically shows an embodiment of an arrangement 700 which may be used in the UE service management network element or the network function selection network element. Comprised in the arrangement 700 are here a processor 706, e.g., with a Digital Signal Processor (DSP). The processor 706 may be a single unit or a plurality of units to perform different actions of procedures described herein. The arrangement 700 may also comprise an input unit 702 for receiving signals from other entities, and an output unit 704 for providing signal(s) to other entities. The input unit and the output unit may be arranged as an integrated network element or as illustrated in the example of FIG. 6*a*-6*c*.

Furthermore, the arrangement 700 comprises at least one computer program product 708 in the form of a non-volatile or volatile memory, e.g., an Electrically Erasable Programmable Read-Only Memory (EEPROM), a flash memory and a hard drive, and those from a network or a cloud connected via the input unit 702 and output unit 704. The computer program product 708 comprises a computer program 710, which comprises code/computer readable instructions, which when executed by the processor 706 in the arrangement 700 causes the arrangement 700 and/or the UE service management network element or the network function selection network element in which it is comprised to perform the actions, e.g., of the procedure described earlier in conjunction with FIGS. 4*b*, 4*c* or FIG. 5.

The computer program 710 may be configured as a computer program code structured in computer program modules. Hence, in an exemplifying embodiment when the arrangement 700 is used in the UE service management network element, the code in the computer program of the arrangement 700 when executed, will cause the processor 706 to perform the steps as described with reference to FIG. 5.

The processor 706 may be a single Central Processing Unit (CPU), but could also comprise two or more processing units. For example, the processor 706 may include general purpose microprocessors, instruction set processors and/or related chip sets and/or special purpose microprocessors such as Application Specific Integrated Circuits (ASIC). The processor 706 may also comprise board memory for caching purposes. The computer program 710 may be carried by a computer program product 708 connected to the processor 706. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

As a whole or by scenario, by providing IP address information of the UE from the old SMF to the new SMF, be it in an I-SMF insertion procedure or an I-SMF change procedure, the IP address information of the UE, e.g. Subscriber IP index, including the IPv6 index, become consistent among SMFs serving the UE, and address/index allocation by the new SMF may work well with that of the old SMF. By providing the new I-SMF address information of the external network element, the way of address/prefix allocation by an external network element (such as DN-AAA server) is enabled at the receiving SMFs.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method for a user equipment (UE) service management network element in a communication network, comprising:

receiving a first request, wherein the first request is a Nsmf_PDUSession_CreateSMContext Request to request insertion of the UE service management network element as an intermediate UE service management network element for a service of a UE; and in response to determining that the first request is to request the UE service management network element to be the intermediate UE service management network element for the service of the UE:

sending a second request to another UE service management network element indicated in the first request, wherein the second request is a Nsmf_PDUSession_Create Request for creating the service of the UE; and receiving a first response corresponding to the second request, wherein the first response comprises Internet Protocol (IP) address information of the UE.

2. The method of claim 1, wherein the IP address information of the UE indicates that an external network element is used for address allocation, and the first response further comprises address information of the external network element.

3. The method of claim 1, further comprising:

using the IP address information for further address-related allocation.

4. The method of claim 2, wherein the IP address information of the UE indicates that an external network element is used for address allocation, and the first response further comprises address information of the external network element, and using the IP address information for further address-related allocation further comprises:

retrieving allocated address from the external network element using the address information of the external network element.

5. The method of claim 1, further comprising:

in response to determining that the first request is a request for creating the service of the UE, sending a second response comprising IP address information of the UE.

6. The method of claim 5, wherein the IP address information of the UE indicates that an external network element is used for address allocation, and the second response further comprises address information of the external network element.

7. The method of claim 1, wherein the IP address information of the UE comprises Subscribers IP Index.

8. The method of claim 3, wherein IPv6 multi-homing applies to the service of the UE, and the IP address information comprises IPv6 prefix, and using the IP address information for further address-related allocation further comprises:

using the IPv6 prefix for IPv6 prefix allocation for one or more UE service anchors.

9. The method of claim 1, wherein the UE service management network element comprises a Session Management Function (SMF) network element, and the service of the UE comprises a Protocol Data Unit (PDU) session of the UE.

10. The method of claim 7, wherein a UE service anchor comprise Protocol Data Unit (PDU) session anchor.

11. The method of claim 2, wherein the external network element comprises a Data Network Authentication Authorization Accounting (DN-AAA) server.

12. The method of claim 1, wherein the communication network comprises a fifth generation network.

13. A communication device in a communication network, comprising:

a storage, adapted to store instructions therein; and a processor, adapted to execute the instructions to cause the communication device to:

receive a first request, wherein the first request is a Nsmf_PDUSession_CreateSMContext Request to request insertion of a user equipment (UE) service management network element as an intermediate UE service management network element for a service of a UE; and in response to a determination that the first request is to request the UE service management network element to be the intermediate UE service management network element for the service of the UE:

send a second request to another UE service management network element indicated in the first request, wherein the second request is a Nsmf_PDUSession_Create Request for creating the service of the UE; and receive a first response corresponding to the second request, wherein the first response comprises Internet Protocol (IP) address information of the UE.

* * * * *